United States Patent [19]

Martinek et al.

[11] 4,390,490
[45] Jun. 28, 1983

[54] FIBROUS CASING EXTRUSION

[75] Inventors: Thomas W. Martinek, Covington, Ind.; George M. Wilmsen, Danville, Ill.

[73] Assignee: Teepak, Inc., Chicago, Ill.

[21] Appl. No.: 138,068

[22] Filed: Apr. 7, 1980

[51] Int. Cl.³ .......................... B29F 3/10; D01F 2/06
[52] U.S. Cl. ................................... 264/173; 264/174; 264/188; 118/404; 118/405; 118/408; 118/410; 118/411; 118/DIG. 10; 118/DIG. 11; 426/135; 426/138; 427/358
[58] Field of Search ............... 118/404, 405, 408, 410, 118/411, DIG. 10, DIG. 11; 427/358; 426/135, 138; 264/173, 174, 188

[56] References Cited

U.S. PATENT DOCUMENTS

| | | |
|---|---|---|
| 2,105,273 | 1/1938 | Smith . |
| 2,115,607 | 4/1938 | Becker ........................ 426/135 |
| 2,144,900 | 1/1939 | Smith . |
| 2,910,380 | 10/1959 | Shiner . |
| 2,944,296 | 7/1960 | Mitchell et al. . |
| 2,958,364 | 11/1960 | Thompson . |
| 2,988,451 | 6/1961 | Zahn . |
| 3,005,728 | 10/1961 | Bridgeford . |
| 3,065,097 | 11/1962 | Zupr et al. . |
| 3,224,885 | 12/1965 | Shiner . |
| 3,275,725 | 9/1966 | Utz . |
| 3,369,911 | 2/1968 | von Witzleben . |
| 3,482,491 | 12/1969 | Gustafson . |
| 3,560,227 | 2/1971 | Gichhern et al. . |
| 3,560,250 | 2/1971 | Brandt et al. . |
| 3,575,708 | 4/1971 | Brandt et al. . |
| 3,669,721 | 6/1972 | Jager . |
| 3,709,720 | 1/1973 | Kindl et al. . |
| 3,956,539 | 5/1976 | O'Brien ............................ 427/358 |

FOREIGN PATENT DOCUMENTS 740089  10/1943  Fed. Rep. of Germany .

*Primary Examiner*—Michael R. Lusignan
*Attorney, Agent, or Firm*—Michael L. Dunn; William J. Crossetta

[57] ABSTRACT

This relates to the formation of sausage casings formed of a fibrous tube by penetrating the tube or web with viscose. A specific coating and extrusion die is provided together with a statement of the discovery that where there is laminar flow the penetration of the viscose is not controlled by the orifice size per se, but by the relative application of the viscose with respect to a column of viscose passing through the same orifice at the same rate.

13 Claims, 3 Drawing Figures

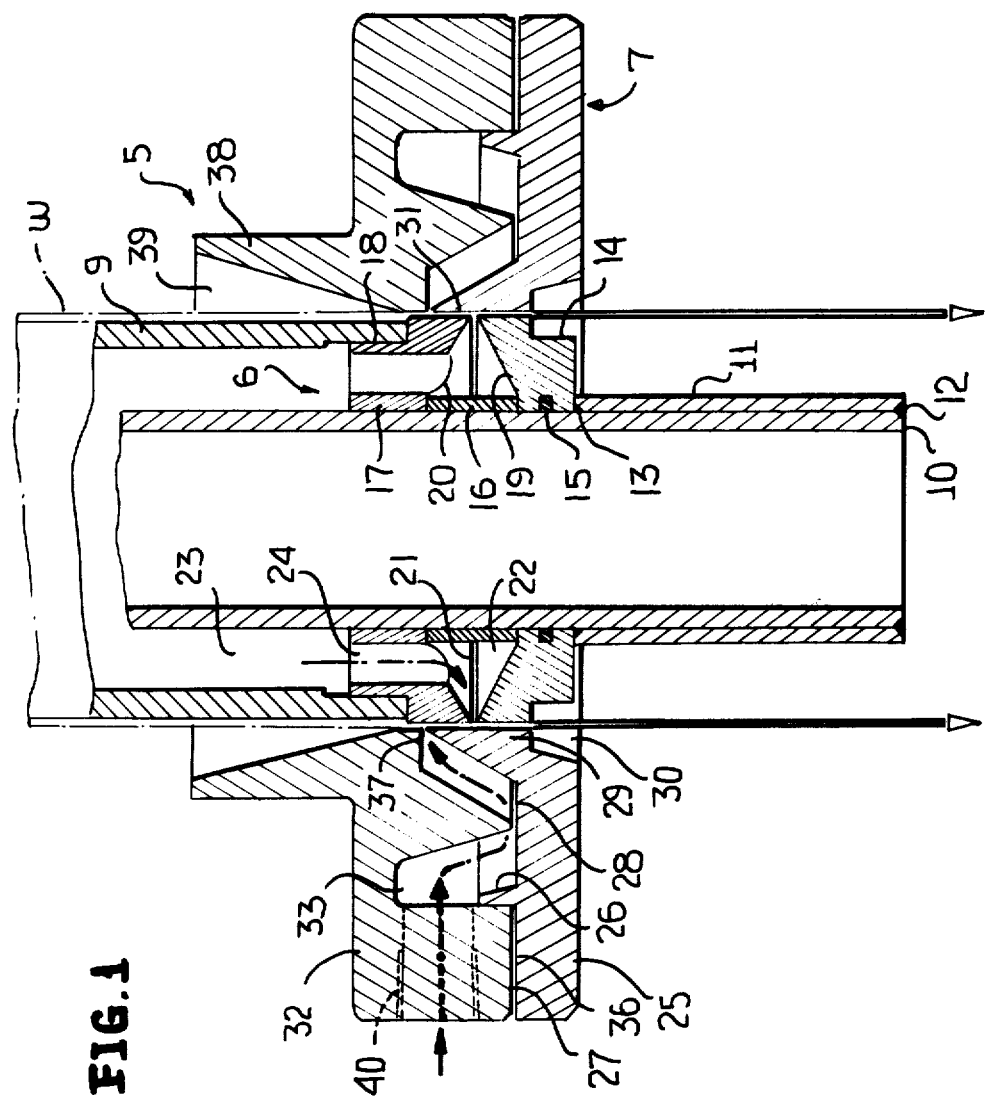

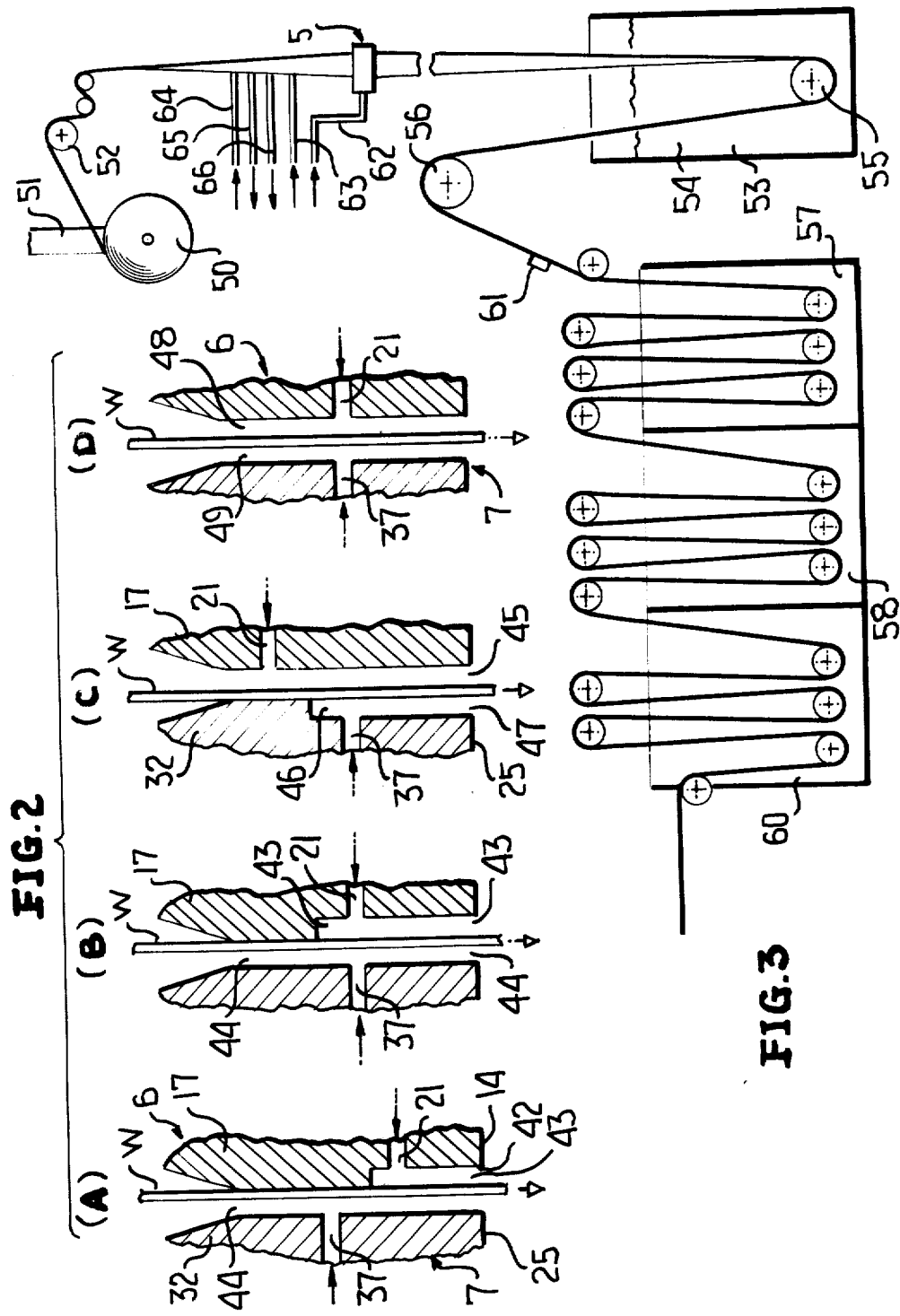

FIBROUS CASING EXTRUSION

This invention relates to new and useful improvements in the forming of a fibrous sausage casing using viscose as a coating material on a fibrous web.

It has been found that, contrary to that which has been known previously, the size of the orifice supplying the coating material is not important and may be of any size as long as the orifices are sufficiently large to supply the volume needed and the orifices may have any location relative to each other when two or more orifices are used.

It has also been found that viscose composition, viscosity and concentration are not important as heretofore believed. Instead, it has been found that the ratio of actual viscose volume supplied per unit time to a theoretical volume determined by the cross-sectional area of the orifice and the viscose velocity per unit of time controls the degree of penetration. Specifically, this ratio, which is hereinafter called "Q" value, has been found to be on the order of 0.52 to 0.66 to provide practically complete and instantaneous penetration. When the "Q" value is below 0.52, penetration of the viscose into the fiber is incomplete. When the "Q" value is above 0.66, flooding invariably occurs.

Most specifically, it has been found that the coating of a paper with a liquid can be effected with complete penetration independently of viscose supply orifice size as long as the orifice is of a size sufficient to supply the required coating liquid and there is laminar flow of the coating liquid alongside the moving paper or fibrous material.

It has also been found that the velocity of the paper through the coating die is an immaterial factor because the paper velocity represents the maximum velocity for laminar flow. A change in paper velocity is matched by an equivalent change in coating liquid volume to keep the coating material to paper ratio constant and the "Q" value remains constant.

By obtaining complete and substantially simultaneous penetration, it is no longer necessary to locate the coating die a considerable distance above the coagulating and regenerating bath, and accordingly either the height of the overall coating and regenerating apparatus may be reduced or the depth of the coagulating and regenerating bath may be increased.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a vertical sectional view taken through a coating die formed in accordance with this invention.

FIGS. 2A, 2B, 2C and 2D are enlarged schematic sectional views showing various relationships between casing and die components, all of which provide for laminar flow of the coating material.

FIG. 3 is a schematic view showing the environment of the invention.

Referring now to the drawings in detail, it will be seen that there is illustrated in FIG. 1 a coating die formed in accordance with this invention, the die being generally identified by the numeral 5. The die 5 includes an inner die portion 6 and an outer die portion 7.

The inner die portion 6 includes an inner tube 8 which entends entirely through the die 5 and which has disposed in spaced concentric relation thereto an outer tube 9. The inner tube 8 has a free end 10 disposed downstream of the die and telescoped over the lower portion of the tube 8 is a tubular support 11 which is secured at its lower end to the inner tube 8 such as by welding 12. The upper end of the tubular support 11 may also be secured to the inner tube 8 as by welding 13.

An inner die lower half 14 is telescoped over the inner tube 8 and is seated on the tubular support 11. In order to prevent escape of the coating liquid, the inner die lower half 14 may be sealed relative to the inner tube 8 by means of a seal 15.

A tubular spacer 16 is telescoped over the inner tube 8 and is seated on the outer die lower half 14.

The inner die 6 also includes an inner die upper half 17 which is seated on the spacer 16 and is telescoped over the inner tube 8. The outer tube 9 is telescoped over the upper portion of the inner die upper half 17 and sealed thereto, such as by way of a threaded connection or compression connection as at 18.

It is to be noted that the upper surface of the inner die lower half 14 is generally frustoconical and is identified by the numeral 19. In a like manner, the inner die upper half 17 has a frustoconical lower surface 20, the tapers of the surfaces 19 and 20 being opposite to one another and converging to the outer part of the inner die 6. This configuration is preferred but is not necessary. The spacer 16 serves to define an inside gap 21. By varying the length of the spacer 16, the width of the gap 21 may in a like manner be varied.

It is to be noted that the space between the surfaces 19, 20 define an annular manifold 22 for directing coating liquid to the gap 21. Also, it is to be noted that the space between the tubes 8, 9 defines an annular supply passage 23 and that there are circumferentially spaced bores 24 in the inside upper half 17 for directing the coating liquid from the supply passage 23 into the manifold 22.

The outer die 7 is of a two-piece construction and includes an outer die lower half 25. The outer die lower half 25 is generally in the form of a circular plate having projecting upwardly from an intermediate portion thereof an aligned rib 26. On opposite sides of the rib 26 there are annular surfaces 27 and 28. The outer die lower half 25 also includes a triangular cross-sectional annular upper inner portion 29 which generally opposes the gap 21 in the illustrated embodiment of the invention.

At this time it is to be noted that the configurations of adjacent lower portions of the inner die lower half 14 and the outer die lower half 25 are notched to define an annular groove 30 which defines the lower limit of the orifice of the die, which orifice is to be described in more detail hereinafter. It is also to be understood that the portion 29 of the outer die lower half 25, in the illustrated relationship of the inner and outer dies, forms, together with adjacent portions of the inner die lower half 14 and the inner die upper half 17 an orifice 31. This orifice has critical dimensions which must provide the laminar flow conditions as will be shown later.

The outer die 7 also includes an outer die upper half 32 which has formed therein a cavity 33 which functions as a manifold. The cavity 33 has projecting thereinto a triangular portion 34 which is spaced from the surface 28 a prescribed distance so as to define an inner gap through which a coating liquid must flow. It is also to be noted that the outer part of the outer die upper half 32 has a surface 35 which opposes the surface 27 and is spaced relative thereto by way of an interchangeable spacer 36. The spacer 36 results in a gap 37 between the two halves of the outer die, the gap 37 generally opposing the outer surface of the inner die upper half 17.

The outer die upper half 32 also is provided with a triangular cross-sectional portion 38 which defines an entrance opening 39 for a fibrous web W into the orifice 31. It is also to be noted that an upper part of the orifice 31 is formed in the illustrated positions of the die parts by opposed portions of the outer die upper half 32 and the inner die upper half 17. Coating liquid is directed into the manifold 33 through a suitable supply passage 40 formed in the outer die upper half 32.

Reference is now made to FIGS. 2A, 2B, 2C and 2D. Referring first to FIG. 2A, it will be seen that the relative parts of the die are so positioned wherein the gap 37 opposes the inner die upper half 17, while the gap 21 opposes the outer die lower half 25. This is generally the arrangement shown in FIG. 1. It is further to be noted that the inner die upper half 17 has an outer surface 41 of a diameter substantially equal to the internal diameter of the fibrous web W and generally functions as a guide for the same. Thus, there is no clearance between the web W and the inner die upper half 17. On the other hand, the inner die lower half 14 has an outer surface 42 of a diameter less than that of the surface 41, thereby providing an orifice portion 43 radially inwardly of the web W below the gap 21. The lower part of the inner die upper half 17 is also notched to form a part of the orifice portion 43 above the gap 21. On the other hand, all of the inner surfaces of the outer die 7 are disposed radially outwardly of the web W so as to define a continuous orifice portion 44 which extends both above and below the gap 37.

With the die arrangement of FIG. 2A, the coating material will be applied on the outside of the web first. With the arrangement of FIG. 2B, it will be seen that the gap 21 has been elevated relative to the gap 37 so that the coating material is applied to both sides of the web W simultaneously.

In FIG. 2C, the internal die gap 21 has been elevated considerably and the inner surface of the die parts 14, 17 are free of notching so as to define a continuous inner orifice portion 45. On the other hand, the diameter of the outer die lower half 25 is reduced and the lower inner corner of the outer die upper half 32 is notched as at 46 so as to define an inner orifice portion 47 of a lesser length than the orifice portion 45. At the same time, the gap 37 is lowered relative to the gap 21. With the die setting of FIG. 2C, the coating liquid is applied to the inner surface of the web W first, and later to the outer surface.

In FIG. 2D, there is illustrated an embodiment of the invention wherein a like amount of coating material is applied simultaneously to both surfaces of the web W. In this embodiment, the inner die 6 is of a constant outer diameter to define a full length inner orifice portion 48. In a like manner, the inner surfaces of the outer die 7 are of a constant diameter so as to define a full length orifice portion 49. The gaps 21 and 37 oppose one another. Other arrangements are possible without departing from the laminar flow requirement.

Laminar flow between parallel plates is described in "Fluid Mechanics," Dodge et al, McGraw-Hill, New York, New York, 1937, page 454. It is shown therein that the average velocity of a fluid passing between two parallel plates is two-thirds of the maximum velocity. From this one can conclude that the maximum volume of fluid which can pass through a parallel plate orifice under laminar flow conditions is two-thirds of the volume that could pass if the fluid had no viscosity and the flow could be considered as plug flow.

Considering the annular space between two diameters, in any given arcuate segment the diameters provide an opening which has the same numerical value as any other segment. In other words, the arcs defining the opening have equivalent plate values. In effect, the annular space is made of parallel plates with no ends. Of course, there is less surface area in contact with the fluid at the smaller diameter, but since this effect is distributed uniformly, no appreciable aberration in flow occurs.

This invention is particularly adapted for applying viscose to a fibrous web to form a sausage casing. Because of the rapid penetration of viscose, the system allows regeneration within two feet of the application of the viscose. The time and travel previously allowed for penetration becomes available for regeneration of the viscose and thus regeneration at speeds well in excess of those previously employed are now possible.

As is stated above, it has been found with respect to the application of a viscose composition to a fibrous web, if the ratio of actual viscose volume used to the theoretical volume for plug flow through the same orifice is maintained between 0.52 and 0.66, paractically complete and instantaneous penetration is obtained.

Reference is now made to the schematic view of FIG. 3 which illustrates a standard type of coating and regenerating apparatus for vibrous webs and wherein the advantages of the coating die 5 will become apparent.

The fibrous web is supplied in reel form such as the reel 50 which is mounted on a support 51. The web W is delivered by a suitable drive mechanism 52 to the coating die 5 and after it passes through the coating die 5 it enters into a tank 53 having therein a coagulating and regenerating bath 54. The coated and at least partially regenerated web passes around a bottom guide 55 where it is flattened. The web W passes up out of the bath 54 and around a guide 56 and is then delivered, as may be desired, into other baths 57, 58 and 60 with there being preferably suitable drying stages wherein the coated and flattened web may be suitably dried.

It has been heretofore the practice to slit the flattened web at regular intervals before it enters the bath 57 utilizing a slitter 61. The slitter forms a vent opening through which gases from an inside coagulant may be vented if not fully removed before the web passes around the guide 55.

For illustration purposes only, the die 5 is provided with an external supply line 62 and an internal supply line 63. An internal coagulant is supplied through a line 64 and is withdrawn through a vacuum line 65. Further, gases within the interior of the casing are vented through a vent line 66.

It is to be understood that the inside coagulant is supplied to the interior of the casing immediately adjacent to the guide 55 and the casing is vented with the inside coagulant to a height generally corresponding to the height of the bath 54. The spent coagulant is withdrawn from the interior of the casing at this point by way of a vacuum.

Gases within the casing above the level of the inside coagulant are removed through the vent line 66.

It is to be understood that all of the lines 62–66 as well as the internal half of the coating die 5 must be supported by a mandrel and that the mandrel extends down into the casing to a point adjacent the guide 55.

In similar apparatus the mandrel length is on the order of twenty-nine feet and the coating die 5 is disposed on the order of twenty feet above the level of the bath 54. However, as pointed out above, there is complete penetration of the viscose through the casing within two feet of the coating die 5. This leaves approximately eighteen feet which may be utilized to lower the height of the apparatus, increase the height of the bath 54, or a combination of both. At the present time the depth of the bath 54 to the guide 55 is on the order of six feet, and by increasing the depth of the bath 54, preferably utilizing a suitable standpipe, the effective depth of the bath 54 could be increased to on the order of four times its present depth. In this manner the residence time in the bath 54 could be raised considerably above its current value. With such residence times, coagulation and regeneration can be essentially completed before the casing exits the tank 53. With this arrangement gasing and water legs due to continued chemical reaction and osmosis after the bottom guide 55 is passed would be essentially completed at a stage where both gas and salt solution can be removed with the spent inside acids. With this arrangment no cuts, or at least reduced frequency of cuts, would be required.

It will therefore be readily apparent that the coating die 5 not only is advantageous from the standpoint of complete penetration and uniformity of coating, but also provides for either greater efficiency or less apparatus height or much higher process speeds.

Although only preferred embodiments of the coating die have been specifically illustrated and described herein, it is to be understood that minor variations may be made without departing from the spirit and scope of the invention as defined by the appended claims.

We claim:

1. In the process of coating moving fibrous web with a liquid supplied from an orifice, the improvement comprising; providing a sufficent orifice opening and providing a volume of said liquid sufficient so as to provide laminar flow of said liquid alongside said moving fibrous web such that penetration of said web by said liquid is fully complete and substantially instantaneous.

2. A method of forming sausage casing, said method comprising the steps of providing an elongated coating orifice of a size sufficient to supply coating liquid required for complete penetration of a selected fibrous web, passing the selected fibrous web in tubular form through said coating orifice, directing viscose into the coating orifice through a supply opening into the coating orifice on at least one side of the web, and said coating orifice further being sized sufficient and the volume of viscose supplied being in an amount sufficient to maintain laminar flow of the viscose through the coating orifice alongside said fibrous web whereby said web is fully and substantially instantaneously penetrated by said coating liquid.

3. The improvement according to claim 1, wherein the ratio of the volume of said liquid in said orifice applied per unit length to said web to the volume of said orifice per unit length is substantially between 0.52 and 0.66.

4. The improvement according to claim 3 wherein both said orifice and the web are tubular.

5. The improvement according to claim 4 wherein said process is employed in forming a sausage casing and the liquid is viscose.

6. A method according to claim 2 wherein the ratio of volume of coating liquid applied per unit length of web to the volume of said coating orifice per said unit length is between on the order of 0.52 and on the order of 0.66 whereby there is complete penetration of said fibrous web by the viscose and flooding is prevented.

7. A method according to claim 2 wherein the speed of web travel through said coating orifice is on the order of 25 feet per minute and above.

8. An extrusion coating die comprising an inner die and an outer die arrangement in spaced concentric relation and defining therebetween a coating orifice, said outer die being of a two-piece construction and including first and second plate-like members joined together with an annular space therebetween defining an outside coating liquid supply gap opening into said coating orifice, passage means within said plate-like member defining a supply channel to said outside supply gap, said inner die including an inner support member and two annular elements telescoped over said inner support member with outer portions of said annular elements being axially spaced and defining therebetween an inside coating liquid supply gap opening into said coating orifice, said inner support members extending above said annular elements in supporting relation, passage means within said annular elements defining a supply channel for said inner supply gap, and supply means coupled to one of said annular elements for supplying a coating liquid to said inside supply gap.

9. The coating die of claim 8 wherein said plate-like members have outer annular portions separated by a replaceable gasket, and said gasket defining means for adjusting the height of said outside supply gap.

10. The coating die of claim 8 wherein said plate-like members have intermediate annular portions disposed in closely spaced relation and defining baffle means in said annular spaced therebetween for coating liquid flowing to said outside supply gap.

11. The coating die of claim 8 wherein said annular elements have inner annular portions in abutment with separated by a replaceable annular spacer telescoped over said inner support member and defining means for varying the height of said inside supply gap.

12. The coating die of claim 8 wherein said inner support member forms an inner wall of an annular supply tube forming said supply means for said inner supply gap, and there is an outer tube telescoped over said inner support member forming an outer wall of said annular supply tube, said outer tube having an end secured to said one annular element.

13. The coating die of claim 8 wherein said inner support member extends below said annular elments and has telescoped thereover below said annular element a tubular support on which a lowermost one of said annular elements is sealed.

* * * * *